Dec. 12, 1933.  E. J. KEARNEY  1,939,266
INDEXING MECHANISM
Original Filed April 24, 1923  3 Sheets-Sheet 1

INVENTOR
Edward J Kearney
BY
Fred A Parsons
ATTORNEY

Patented Dec. 12, 1933

1,939,266

UNITED STATES PATENT OFFICE 1,939,266

INDEXING MECHANISM

Edward J. Kearney, Wauwatosa, Wis., assignor to Kearney & Trecker Corporation, West Allis, Wis.

Continuation of application Serial No. 193,474, May 23, 1927, which in turn is a division of Serial No. 634,292, April 24, 1923. This application March 10, 1932. Serial No. 597,966

1 Claim. (Cl. 90—57)

This invention relates to improvements in dividing head mechanism.

It is the object of this invention to provide a dividing head of great accuracy and driving connections between the indexing mechanism and the work spindle or table which will automatically maintain a proper degree of mesh without the possibility of backlash and will thereby maintain a uniformly accurate drive between these parts.

It is a further object of the invention to provide a driving connection from worm to worm gear in a dividing head assembly with adjustable provision for resilient pressure engagement of the worm and worm gear while preserving all the advantages of a fixed bearing structure.

A further object is generally to simplify and improve the construction and operation of dividing heads, particularly with respect to the indexing mechanism and power transmission operative on the spindle thereof.

This application is a continuation of my former application, Serial No. 193,474, filed May 23, 1927, which in turn is a division of my previous application, Serial No. 634,292, filed April 24, 1923.

In the drawings.

Like parts are identified by the same reference characters throughout the several views.

Figure 1:
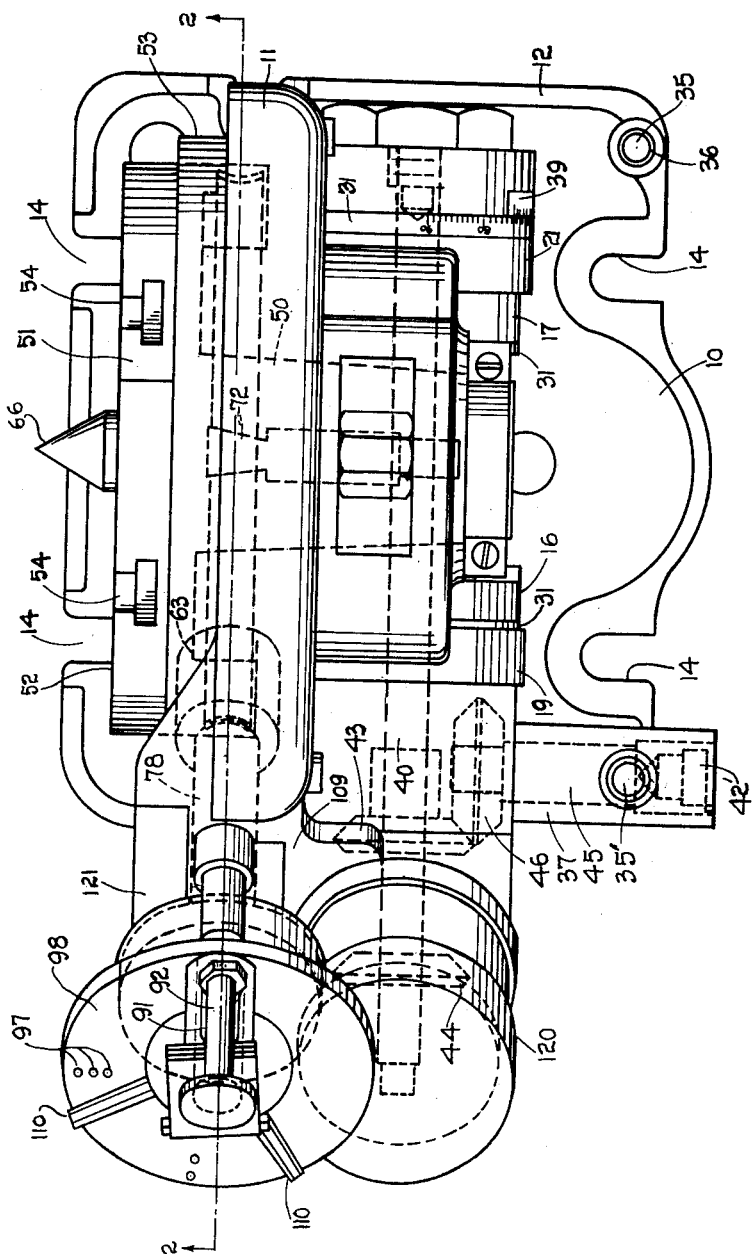
Fig. 1 is a plan view of a machine tool attachment showing my dividing head incorporated therewith.

To a base 10 is hinged a frame 11 carrying a dividing engine including the driving mechanism to which this invention particularly relates. The hinged connection between the base and frame forms the particular subject matter of the above mentioned parent application. Since the subject matter claimed in the parent application is unessential to an understanding of the present invention, it will be very briefly described.

The base plate 10 having a reenforcing flange 12 and notches at 14 to receive securing bolts for its connection with the table of a machine tool, it is provided with upstanding ears 16 and 17 to which knuckles 19 and 21 on the frame 11 are complementary. These knuckles together with a suitable pivot pin provide a pintle or hinge between base 10 and frame 11.

Power is transmitted along the common axis about which the ears and knuckles above described are relatively adjustable. The power shaft is shown in dotted lines at 40 in Fig. 1 and is provided with a complementary source of power consisting in shaft 45 coupled to shaft 40 through bevel gears 46 and 43.

I will now discuss the frame and related parts prior to a disclosure of the means by which motion is transmitted from the shafting in the base to the spindle which is mounted in the frame.

The frame 11 provides a tapered bearing opening within which a correspondingly formed spindle 50 is journaled. A platen or table 51 having a working surface 52 may be and, in the present embodiment of this invention, is an integral part of spindle 50. The platen or table 51 projects axially from a close fitting sleeve 53 which is integral with frame 11. The projection of the table from said sleeve is sufficient to provide for the T slots shown at 54 wherein the heads of bolts may be introduced to secure work in an operative position upon said table or platen. This construction is of advantage because when the device is operated in the position in which it appears in the accompanying drawings, the T slots permit work to be clamped rigidly to the spindle and, when the frame 11 is rotated to bring the axis of the spindle to a vertical position and the working face 52 of platen 51 horizontal, the table may then be used if desired in precisely the same manner as a rotary table attachment which is widely known in the art. I have provided in the frame casting 11 an integral lip portion 55 adapted to receive oil and chips when platen 51 is in use as a table.

For convenience in manufacture the table 51 and worm gear 60 are separate parts. A number of pins or rivets 62 secure the table and worm gear 60 together. The worm gear is driven by a worm 63 which, in turn, is actuated from the shafts 40 or 45 through mechanism hereinafter to be described.

A nut, threaded to the end of the tapered spindle 50, maintains the spindle properly positioned within its bearing. Where the use of a center is desirable, the tapered center pin 66 may be introduced into the axially extending and correspondingly formed opening 67 of spindle 50 wherein it is retained frictionally and by the pressure of the work.

It will be noted that in the present embodiment of this invention the worm gear 60 provides an annular recess for an expansible split ring 70 and is fast to the spindle adjacent the working end thereof and at the periphery of said end. The extremities 71 of ring 70 converge rearwardly as shown in Fig. 1 and between them is fitted the wedge-shaped head 72 of a bolt or pin 73. The extremity 74 of said pin is extended through an apertured upstanding ear 75 between which and the body of frame casting 11 is confined a nut 76 in threaded engagement with bolt 73. The arrangement is such that by the rotation of nut 76 the bolt 73 may be advanced or retracted axially to or from the platen. When the bolt is retracted as aforesaid, its wedge-shaped head 72 acts upon the correspondingly converging end faces 71 of the split ring 70 and thereby expands said ring symmetrically into contact with the annular gear 60. In this way, the gear, together with the spindle and all related parts, may be frictionally bound against movement in either direction and inasmuch as the ring must expand equally in opposite directions from the center line of the device, there will obviously be no tendency for the clamping operation to cause any movement whatever of the spindle. Such an arrangement makes for accuracy since an adjustment once obtained will not be disturbed when the parts are clamped.

The mechanism which drives worm gear 60, the spindle and related parts will now be described commencing with the mounting for worm 63 and the shaft thereof.

The worm 63 may be, and is shown to be, integrally connected with a worm shaft 78 which is provided with a bearing at 79 in a bearing block 80. A disk 81 seats against a shoulder in a recess 82 in the upper portions of said block and is held in place by a ring nut 83 in threaded engagement with the block. The upper and lower surfaces of disk 81 provide races for ball bearings. A lower opposing race 84 seats against a shoulder on the worm shaft 78 and an upper race 85 is backed by a split nut 86 in threaded engagement with worm shaft 78 and adapted to be clamped in any desired adjustment by a transversely extending screw 87. The arrangement is such that the nut 86, upon release of clamping screw 87, may be tightened in a readily understood manner to compress upper and lower races 85 and 84 in the direction of the central race or disk 81, thereby taking up all end thrust through the ball bearings 88. Since the central disk 81 is fixed to block 80 and the upper and lower ball races are confined against axial movement upon said shaft away from said disk, it will be obvious that end thrust acting upon the worm shaft 78 is fully cared for by the described arrangement.

Securely fastened to the upper exposed end of worm shaft 78 by key 89 or otherwise is an arm 90 radially slotted at 91. A handle 92 is adjustable longitudinally of said arm in the slot 91 and is provided with a retractible pin 93, headed at 94, and normally maintained in the position indicated in Fig. 2 by a spring 95. Pin 93 is provided with a reduced portion 96 which is adapted for insertion into a selected aperture 97 of an indexing plate 98 of common and well known construction. In fact, this entire arrangement of a radially slotted arm provided with a manually adjustable and retractible pin movable over the surface of an indexing plate is very well known in the machine tool art.

The plate 98 is rotatable through mechanism hereinafter to be described and may be maintained in a selected position of rotative adjustment by means of a pin 100, axially slidable through a sleeve 101 which is preferably integral with the bearing block 80 in which the worm shaft 78 is turned. Pin 100 has a reduced portion 102 adapted to penetrate from beneath a selected opening 97 in the index plate. Said pin 100 is also provided with a radially projecting handle 103 by means of which the pin may be manipulated manually to and from engagement with the plate. An axially extending slot 104 in the sleeve 101 receives the handle when the pin is to be moved out of engagement with plate 98. When the pin is to be maintained in engagement, it is rotated slightly upon its axis thereby bringing the handle 103 out of registry with slot 104.

Fitting closely upon the worm shaft 78 immediately adjacent the slotted arm 90 is a bushing 105 upon which is journaled a gear 106. The index plate 98 is removably secured to the hub portion 107 of said gear by means of suitable screws or pins 108. It is customary to provide a number of index plates each having apertures 97 regularly spaced in circles thereon with different degrees of separation between the adjacent apertures of each circle. By means of the provision of the screws or pins 108 it is customary to make these plates interchangeable upon the gear 106 which drives them.

It will be understood that when the gear 106 is actuated the index plate 98 secured thereto will move therewith and will impart its motion through pin 93 to the arm 90 and thence to worm shaft 78. The worm shaft is, however, susceptible of independent operation when the pin 93 is manually retracted from engagement with an aperture 97 of the index plate. For the assistance of the operator in determining the degree of movement of the worm shaft independently of the index plate, a pair of radially projecting straight edges 110 may be provided if desired and may conveniently be journaled from bushing 105.

It is particularly to be noted that all of the rotative parts which have just been described, including gear 106 and index plate 98, are concentric with worm shaft 78 and being journaled therefrom are dependent on said shaft for their position. This is important for the reason that worm shaft 78 together with all of the parts attached thereto and dependent thereon as aforesaid are bodily adjustable.

Figure 2:
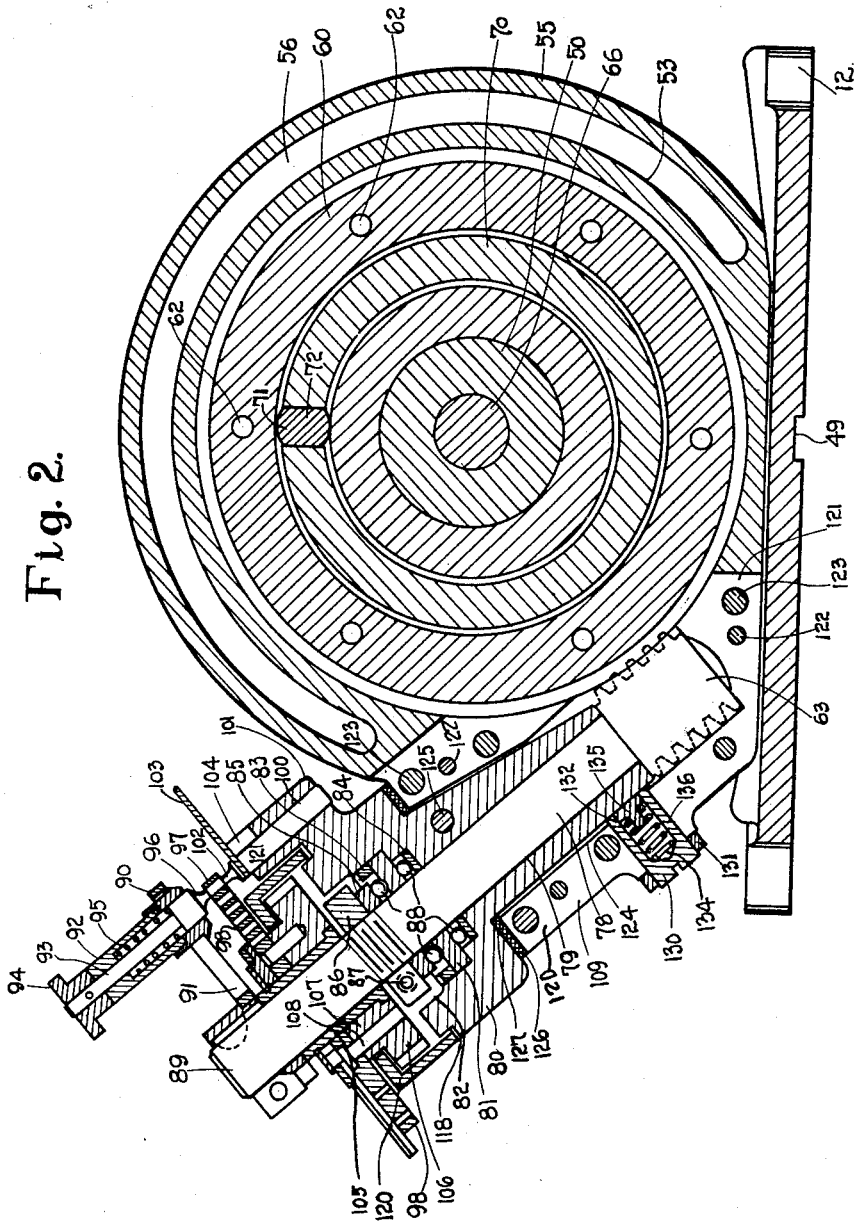
Fig. 2 is a section taken on line 2—2 of Fig. 1.
Figure 3:
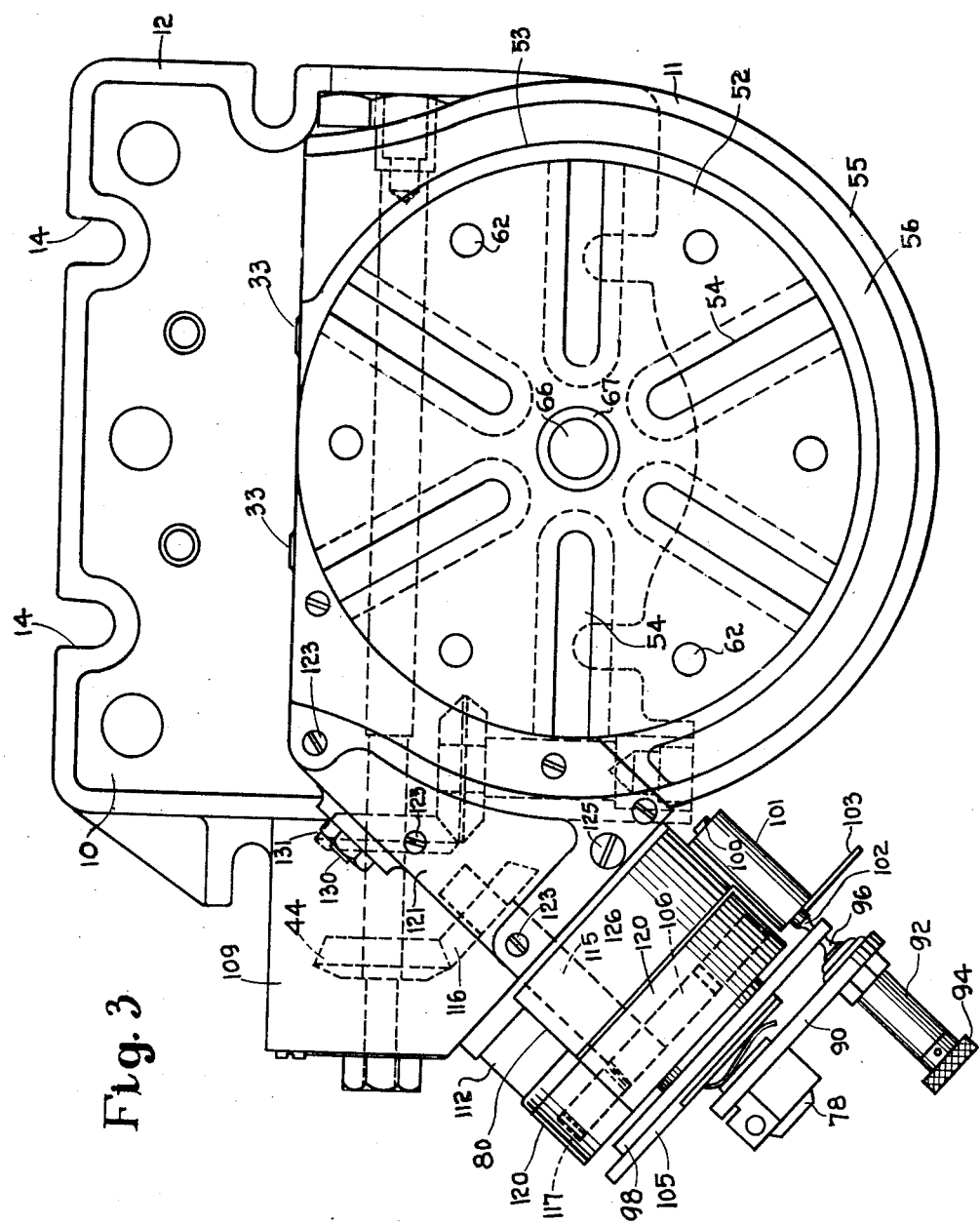
Fig. 3 is a plan view of a machine tool attachment embodying my device, the work table of the attachment being in a horizontal position.

The lower portion of bearing block 80 is enclosed in a housing which may be separable, as shown, into two parts upon the section or plane on which Fig. 2 is taken. That portion of the housing which lies on the side of said plane remote from platen face 52 is preferably integral with frame 11 and is herein designated by the reference character 109.

A shaft 115 having a bearing block 112 carries a bevel gear 116 meshing with the gear 44 upon the transverse drive shaft 40 and at its upper end carries a pinion 117 which may, as shown, be integral therewith. This pinion meshes with gear 106 upon worm shaft 78 and thereby completes the driving connection between the angularly related driving shafts in the base of the device and the spindle which is located in frame 11.

The bearing block 112 which has been described above as providing a bearing for intermediate shaft 115 is shouldered to provide a seat for a cap 120 which houses pinion 117 and also extends integrally about gear 106. The bearing block 80 in which the worm shaft is journaled is shouldered at 118 to receive the cap member 120 with a loose fit. The cap member also extends loosely between said bearing block 80 and the sleeve 101 in which the pin 100 is slidable. It has already been suggested that the entire bearing block 80, together with the worm shaft, worm and related parts, is bodily adjustable and the object of providing a loose fit between cap member 120 and the bearing block 80 is to permit of the aforesaid adjustment.

It has been pointed out that the entire structure which supports the intermediate shaft 115 is connected integrally with the frame member 11. At the one side of the plane in which Fig. 2 is taken, to-wit, in the direction of the platen face 52 therefrom, the housing for the worm shaft 78 is completed by a removable segmental housing member 121 which is aligned by means of dowels 122 and is secured in place by means of a number of bolts or cap screws 123. The segmental removable housing member 121 together with the permanent portion 109 of the housing provides a central opening 124 which, at all points, is of greater diameter than the corresponding portions of bearing block 80, whereby a limited freedom of movement of said bearing block within the enclosing housing is permitted. Preferably the opening 124 is of a size adequate to permit the bodily removal of worm 63 therethrough. For this reason, the portion 121 of the housing need not, if desired, be made independently removable from the remaining portions 109 thereof.

A pivot pin 125 passes through a portion of bearing block 80 and through the housing elements 109 and 121 upon either side thereof. The axis of pivot pin 125 is normal to the axis of worm shaft 78 and is parallel to the axis of the spindle and of the worm gear 60, the arrangement being such that upon this pivot pin the worm 63 can oscillate to and from the worm gear in the plane thereof and substantially on a radius thereof. A gasket 126 of felt or other like compressible material is preferably interposed between the shoulder 127 of bearing block 80 and the underlying upper surface of housing members 109 and 121.

The space within which the worm, worm shaft and related parts are adjustable may, if desired, be very limited since, with care, the worm can be made to fit the worm gear with great accuracy. I have found, however, that despite the exercise of maximum care, an absolutely perfect fit between the worm and worm gear cannot be obtained. The pivotal mounting of the worm shaft, worm and related parts permits the maintenance of a constant pressure of the worm upon the worm gear establishing their working surfaces in constant pressure contact in spite of minute variations in pitch diameters of the gear or worm and thereby prevents backlash such as might conceivably originate from this or other causes. This construction also permits of the adjustment of the worm in the direction of the gear to compensate for wear.

It will be noted that the gear 117 with its driving shaft 115 is not bodily movable with respect to the integral portion 109 of frame 11. Gear 106, however, which meshes with gear 117 is movable with the parts adjustable as aforesaid. Accordingly, when the worm 63 adjusts itself or is adjusted with respect to worm wheel 60 some slight displacement of gear 106 will take place with respect to gear 117. A study of the arrangement of the parts, however, will disclose the fact that such a displacement will not only be very slight in amount but will take place in a direction such that even a much greater displacement could occur without any perceptible change in the degree of mesh of these gears.

In threaded engagement with the housing elements 109 and 121 is a tubular screw 130 upon which is threaded a lock nut 131. The inner margin 132 of said screw abuts against the bearing block 80 immediately adjacent worm 63. This screw, therefore, comprises an adjustable positive stop for limiting the bodily movement of the worm, worm shaft and related parts away from the worm gear about pivot pin 125. Movable within the cylindrical aperture 134 of tubular screw 130 is a plunger 135 which is normally thrust outward by means of a compression spring 136. This spring is preferably of sufficient strength to maintain the worm in substantially constant pressure contact with the worm gear. Other types of pressure applicators might be used for this purpose. Obviously, within limits, the spring alone will prove adequate to maintain the worm and worm gear within the desired closely fitted relation, but in a tool of this character where a maximum degree of accuracy is sought, it is considered preferable to add to the spring the adjustable stop 132. This feature makes it unnecessary to provide a spring capable of withstanding the maximum thrust between the worm and worm wheel. The stop 132 will at all times maintain the parts in their proper relation with the same degree of accuracy which it is possible to obtain in the use of any device of this character which has heretofore been made. The spring 136 eliminates backlash and thus makes for greater accuracy, particularly during the manual adjustment of the spindle, when absolute accuracy is most desirable.

It is not considered necessary to provide means for adjusting the compression of spring 136. Any such means may be provided, however, if such an arrangement may be found to be desirable.

The positive stop which is provided for the bearing member carrying these parts is adapted to maintain the worm and worm gear in mesh with an accuracy at least equal to that which is possible in the best constructions heretofore known. The worm and worm gear will, of course, be machined with the greatest possible accuracy and consequently even without the provision of the spring 136 a dividing engine embodying this invention will be as accurate as any prior construction. Where spring 136 is used, all wear will be compensated for automatically by the pressure of the spring and the worm will furthermore be automatically pressed in the direction of the worm wheel to maintain a close mesh between these two gears in spite of any unavoidable inaccuracies which may exist in either or both. Between gears which are thus maintained in mesh, there is almost no possibility for backlash to occur.

I claim:

In a dividing head attachment, the combination of a base adapted to be removably fixed with a machine tool or similar table, a frame supported from said base to be swivelled about an axis, a spindle rotatably supported from said frame, means carried by said frame for the step by step indexing of said spindle, a connection from said means to said spindle including a pair of intermeshed gears, one of which is fixed on said spindle and the other of which is bodily movable to increase or decrease the degree of mesh thereof, a stop adjustably limiting said bodily movement in the direction which decreases the gear engagement, means for fixing the position of said stop for maintaining said gears in substantially fully meshed engagement, resilient means urging said bodily movement in a direction to increase the gear engagement, and a power train connectible with said spindle through said pair of gears and including a member coaxial with said axis and another member receiving power through the first mentioned member and bodily movable with the swivelling movement of said frame.

EDWARD J. KEARNEY.